J. L. TANDY.
SICKLE BEARING FOR MOWERS.
APPLICATION FILED JULY 21, 1919.
1,381,518.
Patented June 14, 1921.
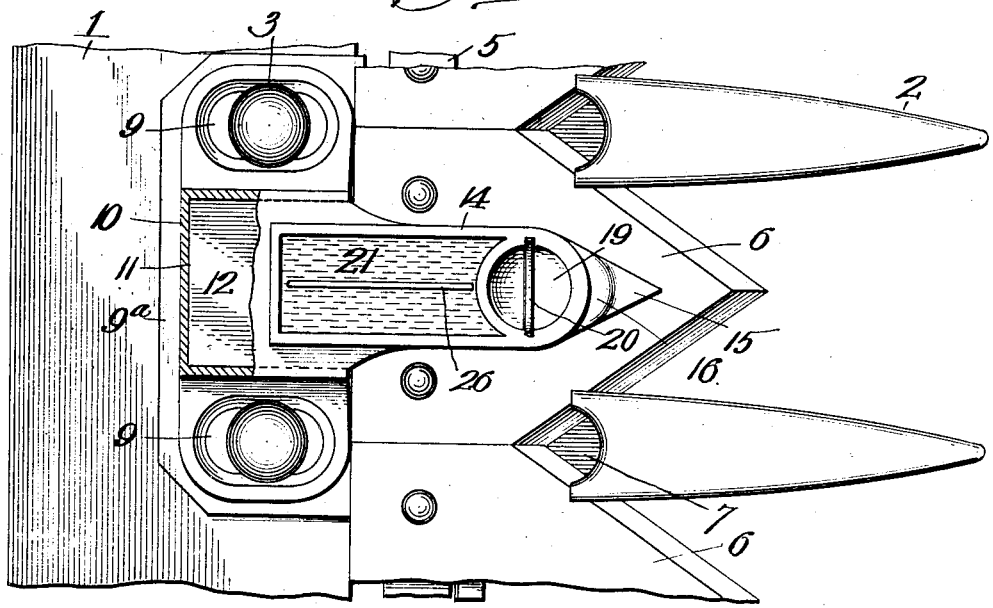
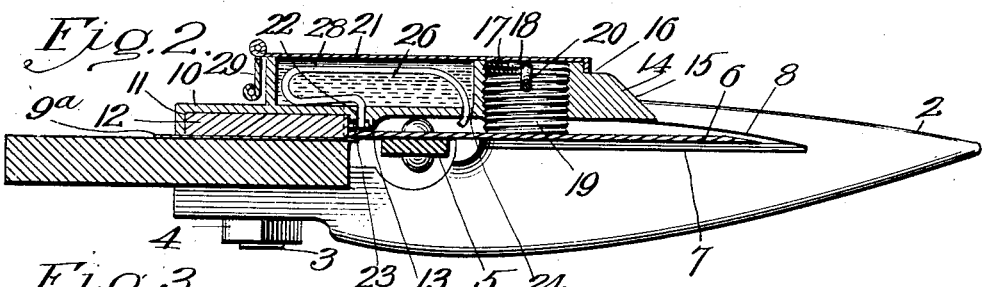
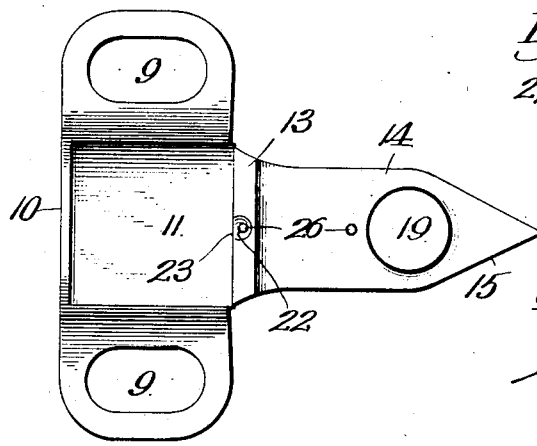
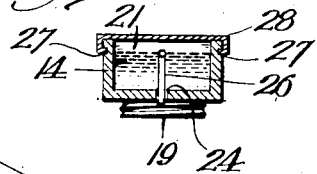
INVENTOR
John L. Tandy
BY
George F. Thorpe
ATTORNEY

UNITED STATES PATENT OFFICE.

JOHN L. TANDY, OF TULSA, OKLAHOMA.

SICKLE-BEARING FOR MOWERS.

1,381,518. Specification of Letters Patent. Patented June 14, 1921.

Application filed July 21, 1919. Serial No. 312,240.

*To all whom it may concern:*

Be it known that I, JOHN L. TANDY, a citizen of the United States, residing at Tulsa, in the county of Tulsa and State of Oklahoma, have invented certain new and useful Improvements in Sickle-Bearings for Mowers, of which the following is a specification.

This invention relates to sickle bearings for mowers and has for its object to produce bearings susceptible of attachment easily and quickly to most of the approved types of mowers, having adjustable means for holding the sickle sections flatly upon the ledger plate and therefore in the best possible position to cut effectively and to retain the sharpness of their cutting edges. Another object is to produce bearings having square hard-metal wear plates to take the backward thrust of the sickle sections to minimize the frictional resistance and lengthen the period of service of the structure. A further object is to produce a bearing providing for such adjustment of the square bearing plates as to dispose the lower half of either of the four edges of such plates for receiving the thrust of the sickle sections and for the inversion of such plates to present the other halves of their edges to such thrust; thereby utilizing such plates for octuple service. A further object is to produce a bearing having an oiling chamber for supplying oil to the friction points and means for preventing the clogging of the feed of oil from said chamber. A still further object is to provide a bearing having an oiling chamber provided with a cover of such character that the pressure of grain being cut tends to retain it securely in position.

With these objects in view the invention consists in certain novel and peculiar features of construction and organization of parts as hereinafter described and claimed; and in order that it may be fully understood reference is to be had to the accompanying drawing, in which:

Figure 1, is a fragmental plan view of a sickle bar embodying my invention, one part of the improvement being broken away and another part omitted.

Fig. 2, is a central vertical transverse section of Fig. 1.

Fig. 3, is an inverted plan view of my improved bearing, with certain parts omitted.

Fig. 4, is a cross section taken through the stem of the bearing.

In the said drawing, 1 indicates the finger bar of the mower and 2 the fingers bolted as at 3 to said finger bar, retaining nuts 4 engaging the lower ends of the bolts 3.

5 is the sickle bar arranged in front of and parallel with the finger bar and equipped with the usual sickle sections 6 for shear action upon the ledger plates 7 secured to the fingers, the cutting edges of the sickle sections operating as usual in the bifurcations 8 of the fingers.

Occasional pairs of adjacent bolts 3 are utilized to secure my improved sickle bearings in place, usually there will be about six of these sickle bearings, one only being shown. The bearings in plan view approximate the letter T in form, and the bolts of adjacent fingers, extend through short slots 9 in the ends of the head portion of the bearing, the latter being mounted upon a thin wearing plate 9$^a$ fitted upon the finger bar and projecting slightly forward of the same and engaging the lower sides of adjacent sickle sections 6 as customary. The head portion of the bearing is formed midway between the slots with a raised portion 10 formed in its underside with a rectangular chamber or recess 11 wherein snugly fits a square wearing plate 12 for engagement by the rear edges of the adjacent sickle sections 6, it being noted that the front wall of the chamber or recess 11 is preferably wider than the other walls but does not depend the full depth of plate 12 and constitutes in conjunction with the opposing edge of plate 12 and the adjacent edge of wearing plate 9$^a$, a channel wherein the rear edges of adjacent sickle sections are free to reciprocate, it being noted however, that the wall 13 is slightly spaced above the sickle sections so as to have no frictional contact therewith.

The stem portion 14 of the T-shaped bearing projects forwardly to a point between the adjacent fingers, and its front end is tapered as at 15 at the top and sides to facilitate its passage through grain and stubble, and it is also formed with a recess 16, as hereinafter more particularly referred to.

The stem is provided near its front end with a threaded opening 17 having vertical recesses 18 at diametrically opposite points. 19 is a clamping screw engaging said opening 17 and the underlying sickle section, to hold the latter flatly down upon the adjacent ledger plates, said clamping screw being adjustable to take up wear between the sickle section and the ledger plates. The customary kerf in the upper end of the clamping screw whereby it can be conveniently turned by means of a screw driver, is engaged by a cross pin 20 fitting at its opposite ends in the recesses 18, the arrangement being such that the pin acts to lock the clamping screw against accidental rotation. The cross pin is preferably of slightly inverted arched form so that its central portion can engage the kerf in the clamping screw when the latter has been adjusted downward a considerable distance, without necessitating material up and down movement of the pin itself in the recesses 18.

Rearward of the clamping screw, the stem portion of the bearing is provided with a chamber 21 for containing lubricating oil, and the bottom of the chamber has an oil hole 22 extending through the rib 13 and enlarged at its lower end as at 23 so as to open against the front edge of the bearing plate 12 as well as upon the rear edge of the underlying sickle section. At the front end of the oil chamber is an oil hole 24, and fitting in the chamber is a bent rod 26 terminating in depending ends respectively fitting loosely in the holes 22 and 24, one extremity of the rod being so bent as to guard against the accidental disengagement of such end from the oiling hole. This rod tends to agitate the oil under the vibratory action of the machine and thus prevent the oil holes from clogging. As a result oil is fed from the chamber upon the rear edges of the adjacent sickle sections and the front edge of the wearing plates 12 and upon the underlying wearing plate 9ª. Oil also passes through the hole 24 upon the sickle member and will work to and around the clamping screw so that the point of engagement between the latter and the sickle member shall be lubricated and therefore enable the said member to work with minimum friction.

In line with the recess 16, the side walls of the stem 14, are provided with parallel grooves 27 for receiving the flanged edges of a slidable cap 28 covering the oil chamber and the clamping screw opening to retain the oil and exclude foreign particles from said chamber and opening. The cap is provided with a pivoted handle 29 for convenience in securing it in and removing it from position, and the front end fits down into the recess 16, the purpose of the latter being to permit the cap to be slid back until its upper front edge is in substantially the same inclined plane as the front end of the stem, and thus offer no abrupt surface for stubble or grain to lodge upon, it being noted, however, that should stubble or grain apply pressure on the cap in the progress of the machine across the field, it will tend to hold the cap in position.

From the above description it will be apparent that I have produced a device of the character described which possesses all the features of advantage set forth, and while I have described and claimed the preferred embodiment of the same I reserve the right to make all changes properly falling within the spirit and scope of the appended claims and the principle of construction involved.

I claim:

1. A sickle bearing secured to the finger bar of a mower and overlying the cutting mechanism thereof and provided with an inverted pocket, and a hard bearing plate fitting removably in said pocket to receive on its front edge the backward thrust of sickle sections of the cutting mechanism of the mower.

2. A sickle bearing secured to the finger bar of a mower and overlying the cutting mechanism thereof and provided with an inverted pocket, and a hard bearing plate fitting removably in said pocket to receive on its front edge the backward thrust of sickle sections of the cutting mechanism of the mower; the bearing having an oil chamber and an oiling hole for conducting lubricant from said chamber to the contact between the said plate and sickle sections.

3. A sickle bearing secured to the finger bar of a mower and overlying the cutting mechanism thereof and provided with an inverted pocket, and a hard bearing plate fitting removably in said pocket to receive on its front edge the backward thrust of sickle sections of the cutting mechanism of the mower; the bearing having an oil chamber and an oiling hole for conducting lubricant from said chamber to the contact between the said plate and sickle sections, and means to keep said oiling hole open.

4. A sickle bearing secured to the finger bar of a mower and overlying the cutting mechanism thereof and provided with an inverted pocket, and a hard bearing plate fitting removably in said pocket to receive on its front edge the backward thrust of sickle sections of the cutting mechanism of the mower; the bearing having an oil chamber and an oiling hole for conducting lubricant from said chamber to the contact between the said plate and sickle sections, means to keep said oiling hole open, and a cover for and removable from the bearing by forward slidable movement thereon.

5. A sickle bearing secured to the finger bar of a mower and overlying the cutting mechanism thereof, provided with an inverted angular pocket, the front wall of which terminates in a plane above that of the cutting mechanism, and a hard bearing plate fitting in said pocket and adapted to receive below said front wall of the pocket the rearward thrust of sickle sections of the cutting mechanism, said plate being reversible to dispose an unworn edge to the thrust of the said sickle sections.

6. A sickle bearing having an inverted pocket of square form with its front wall shallower than the pocket, and a hard square bearing plate fitting in the pocket with the lower part of its front edge exposed by the shallow front wall of the pocket; said plate being reversible to expose the other part of said edge below the front wall of the pocket.

7. A sickle bearing having an inverted pocket of square form with its front wall shallower than the pocket, and a hard square bearing plate fitting in the pocket with the lower part of its front edge exposed by the shallow front wall of the pocket; said plate being reversible to expose the other part of said edge below the front wall of the pocket, and being adjustable to face either of its other edges forwardly for exposure below the front wall of the pocket.

8. A sickle bearing secured to the finger bar of a mowing machine and overlying cutting mechanism thereof and provided with a vertical threaded opening at its front end, a threaded pin engaging said opening and bearing upon the cutting bar of the mower, a cross pin fitting in the upper end of the threaded pin and also fitting in and interlocked with the said bearing to prevent rotation of said pin, and means for covering said pin and threaded pin.

9. The combination with a finger bar, fingers projecting therefrom, a wearing plate on and projecting beyond the front edge of the finger bar, a reciprocating cutter bar comprising sickle sections for operating through said fingers and on said wearing plate, a sickle bearing secured upon the wearing plate and provided with an arm projecting forwardly over the cutter bar; said sickle bearing having an inverted pocket, an oil reservoir, a threaded opening forward of the reservoir, the latter having a pair of oiling holes, one adjacent the threaded opening and the other adjacent the front side of said pocket, a hard bearing plate fitted in said pocket and receiving the thrust of the rear edge of the sickle sections of said cutting bar, a threaded pin in the said threaded opening and engaging the upper face of said cutter bar, a cover for the reservoir and threaded opening, and a bent rod standing in the reservoir and having downturned ends respectively engaging said oiling holes.

In testimony whereof I affix my signature.

JOHN L. TANDY.